United States Patent
Tahir et al.

(10) Patent No.: US 12,403,458 B1
(45) Date of Patent: Sep. 2, 2025

(54) DATE PALM SYRUP—GRAPHITIC CARBON NITRIDE COMPOSITE AND METHODS OF MAKING AND USING SAME

(71) Applicant: United Arab Emirates University, Al Ain (AE)

(72) Inventors: Muhammad Tahir, Al Ain (AE); Malaz Suliman, Al Ain (AE)

(73) Assignee: United Arab Emirates University, Al Ain (AE)

( * ) Notice: Subject to any disclaimer, the term of this patent is extended or adjusted under 35 U.S.C. 154(b) by 0 days.

(21) Appl. No.: 19/195,954

(22) Filed: May 1, 2025

Related U.S. Application Data

(62) Division of application No. 18/947,519, filed on Nov. 14, 2024, now Pat. No. 12,311,344.

(51) Int. Cl.
*B01J 27/24* (2006.01)
*B01J 35/39* (2024.01)
*B01J 37/04* (2006.01)
*B01J 37/08* (2006.01)
*C01B 3/04* (2006.01)

(52) U.S. Cl.
CPC .............. *B01J 27/24* (2013.01); *B01J 35/39* (2024.01); *B01J 37/04* (2013.01); *B01J 37/08* (2013.01); *C01B 3/042* (2013.01)

(58) Field of Classification Search
None
See application file for complete search history.

(56) References Cited

U.S. PATENT DOCUMENTS

2020/0391190 A1   12/2020   Alomair

OTHER PUBLICATIONS

Rambabu et al, Green synthesis of zinc oxide nanoparticles using Phoenix dactylifera waste as bioreductant for effective dye degradation and antibacterial performance in wastewater treatment, Journal of Hazardous Materials, 402 (Year: 2021).*
Ong, Wee-Jun, et al. "Graphitic Carbon Nitride (g-C 3 N 4 )-Based Photocatalysts for Artificial Photosynthesis and Environmental Remediation: Are We a Step Closer To Achieving Sustainabilit?" Chemical Reviews, vol. 116, No. 12, Jun. 2016, pp. 7159-329.

(Continued)

*Primary Examiner* — Stefanie J Cohen
(74) *Attorney, Agent, or Firm* — Boyle Fredrickson, S.C.

(57) ABSTRACT

A method of making a making a date palm syrup-graphitic carbon nitride composite is provided comprising providing a graphitic carbon nitride and a date palm syrup (DPS), heating the graphitic carbon nitride at a temperature of about 550° C., mixing the heated graphitic carbon nitride with the DPS with stirring to form a mixture such that the concentration of the DPS in the composite is in the range of 10% to 60%, and drying the mixture to form the DPS-graphitic carbon nitride composite. The DPS-graphitic carbon nitride composite is suitable for use as a photocatalyst. Also provided is a method generating hydrogen from water contacting DPS-graphitic carbon nitride composite with water with stirring in presence of light. The hydrogen generated using the method is in the region of 3210 μmol $g^{-1}$ to about 7434.6 μmol $g^{-1}$.

6 Claims, 16 Drawing Sheets

(56) References Cited

OTHER PUBLICATIONS

Mishra, Amit, et al. "Graphitic Carbon Nitride (g-C3N4)-Based Metal-Free Photocatalysts for Water Splitting: A Review." Carbon, vol. 149, Aug. 2019, pp. 693-721.

Bhanderi, Dhavalkumar, et al. "Graphitic Carbon Nitride (g-C 3 N 4 ) as an Emerging Photocatalyst for Sustainable Environmental Applications: A Comprehensive Review." RSC Sustainability, vol. 2, No. 2, 2024, pp. 265-287.

Ajiboye, Timothy O., et al. "Graphitic Carbon Nitride-Based Catalysts and Their Applications: A Review." Nano-Structures & Nano-Objects, vol. 24, Oct. 2020, p. 100577 (23 pages).

Farousha, Khadija, et al. "Date Seed Extract Encapsulated-MCM-41 Incorporated Sodium Alginate/Starch Biocomposite Films for Food Packaging Application." International Journal of Biological Macromolecules, vol. 282, Dec 2024, p. 136785. DOl.org (Crossref), https://doi.org/10.1016/j.ijbiomac.2024.136785.

\* cited by examiner

DATE PALM SYRUP—GRAPHITIC CARBON NITRIDE COMPOSITE AND METHODS OF MAKING AND USING SAME

This application is a DIV of U.S. patent application Ser. No. 18/947,519 (filed Nov. 14, 2024) (now U.S. Pat. No. 12,311,344). The disclosures of all these prior applications are incorporated herein by reference.

TECHNICAL FIELD

The invention relates to the field of catalysts. More particularly, the invention relates to the field of photocatalyst. The invention further relates to a photocatalyst for water splitting.

BACKGROUND

Date-palm (*Phoenix dactylifera*) is a tropical and subtropical tree that belongs to the Palmae (Arecaceae) family.

In the middle east region especially, date palms are widely grown for their fruits especially. These date palm fruits, "dates" find their use in food and pharmaceutical industries, in addition to its general consumption. However, despite its many uses, dates are often major sources of waste generated as a result of over production. As the food and pharmaceutical industry have stringent regulations in the quality of dates, anything less than standard is considered waste. Similarly, in the consumer industry, the mere appearance of date would determine whether or not the same would find its way into the groceries. Unfortunately, despite the best efforts by the farmers, tons of less than perfect dates finds its way into landfill. There therefore exists a need to be able to put the unused dates to better use to reduce the environmental impact.

Hydrogen is considered as a clean and renewable energy source. Efforts are undertaken worldwide for hydrogen generation and recovery using hydrogen source materials. Recently, water splitting as a means for hydrogen recovery is gaining traction. There are different catalyst available commercially for photocatalytic hydrogen production. Graphitic carbon nitride (g-C3N4) is currently being widely used for generating hydrogen by photocatalytic water splitting. Graphitic carbon nitride ($g-C_3N_4$) is a family of carbon nitride compounds with a general formula near to $C_3N_4$. There are several efforts being made to prepare g-C3N4-based nanocomposites and composite based catalyst. However, the currently available catalysts have several disadvantages.

The current processes for preparing catalysts are expensive. The expense is increases due to the availability and the cost of the raw material. Raw materials for doping such as titanium, nickel etc. are expensive which contributes to the cost of the final catalyst. Also, the processes for preparing such catalyst are extensive, thereby increasing the costs. Further, the catalyst currently available are not biodegradable, thereby adding to the environmental problems.

There exists a combined need to reduce the environmental impact generated from the date palm industry and the chemical industry synergistically.

SUMMARY OF THE INVENTION

In a first aspect, there is provided a method of making a date palm syrup-graphitic carbon nitride ($DPS/g-C_3N_4$) composite. The date palm syrup-graphitic carbon nitride composite may be used as a catalyst for so-called "water splitting", wherein hydrogen is generated by the splitting of water into hydrogen and oxygen.

The method comprises providing a graphitic carbon nitride ($g-C_3N_4$), providing a date palm syrup (DPS), heating the graphitic carbon nitride, mixing the heated graphitic carbon nitride with the date palm syrup to form a mixture, drying the mixture to form the date palm syrup-graphitic carbon nitride composite. In a particular embodiment, the mixing may be achieved by stirring.

The date palm syrup provided is formed by making an extract from the dates fruit. The date fruit may be selected from any varieties of dates palm. The extract may also be made by simply crushing the date fruit into pulp in a medium. The medium may be aqueous, or alcohol based. Hydrophobic medium may also be used for extraction.

The date palm syrup prepared may be a homogenous mixture or may have some lumps therein. The presence of lumps (or non-homogenous parts) in the date palm syrup does not the hinder the process of preparing the composite.

The graphitic carbon nitride may be heated at a temperature of 550° C. This process may also be termed as calcination. Calcination of the graphitic carbon nitride is performed for its activation and to make the graphitic carbon nitride become more receptive to forming a composite with the date palm syrup. The step of calcination enables removal of any impurities or volatile compounds adsorbed in the graphitic carbon nitride.

In one embodiment of the invention, the date palm syrup may be mixed with the graphitic carbon nitride, so as to maintain the date palm syrup concentration in the range of 10% to 60% in the composite.

In another embodiment of the invention, the date palm syrup may be mixed with the graphitic carbon nitride, so as to maintain the date palm syrup concentration in the range of 50% in the composite.

The step of drying the composite may be carried out at 100° C. until the mixture is dried. The drying may be carried out in vacuum. Drying the composite in vacuum provides several advantages. These advantages may include:

Lower drying temperature may be employed which enables preserving the quality of the composite.

Drying in vacuum is faster, therefore consumes less time,

As the time consumption is reduced during at least the drying step, there will be energy savings.

Drying the composite may result in a dry powder composite which may be easily stored, transported and used. Further, it is noted that although it is preferred to have the composite in a powder form, the composite may also be in the form of pellets, granules and the like. Also, the composite may or may not be homogenous.

In another embodiment of the invention, before mixing the graphitic carbon nitride with the date palm syrup, the graphitic carbon nitride is mixed in an aqueous medium.

In another embodiment of the invention, before mixing the date palm syrup with the graphitic carbon nitride, the date palm syrup is mixed in an aqueous medium.

In yet another embodiment of the invention, an aqueous medium is added to the mixture of the graphitic carbon nitride and the date palm syrup before mixing them together.

Addition of an aqueous medium enables easy mixing of graphitic carbon nitride and date palm syrup.

In a second aspect of the invention, there is provided a method of hydrogen generation from water. The method comprises providing water, providing a date palm syrup-graphitic carbon nitride composite and contacting the date palm syrup-graphitic carbon nitride composite with water in presence of light for generating hydrogen. The step of contacting may be performed while stirring the graphitic carbon nitride composite with water.

The step of stirring is important as it increases the surface area of contact between the composite and the water. Although it is mentioned that the composite and water are stirred, it is noted that instead of stirring, other means such as agitation or vibrations may also be used.

The water may be obtained from any sources such as desalinated water, sea water, deionised water, recycled water, ocean water, brackish water, ground water and wastewater. Further, water from different sources may be combined and used together.

In an aspect of the invention, an electron donor is added to the mixture of date palm syrup-graphitic carbon nitride composite with water. This electron donor is also known as sacrificial agent that helps in increasing the hydrogen generation.

The process of generating hydrogen by date palm syrup-graphitic carbon nitride composite is an exothermic process. The method therefore also involves controlling the reaction temperature at a temperature of about 10-15° C. The temperature controlling is achieved by means of using cooling and heating jackets. In some embodiments, the cooling and heating jackets may have sensors which may be configured to detect the reaction temperature and allow for cooling or heating of the reactants and the mixture, as applicable.

By the method as described in the second aspect, contacting the date palm syrup-graphitic carbon nitride composite with water in presence of light may enable hydrogen generation in concentration of about 3034.6 $\mu mol\ g^{-1}$ to about 7434.6 $\mu mol\ g^{-1}$.

In a third aspect of the invention is provided a date palm syrup-graphitic carbon nitride composite for use as a photocatalyst.

The yield of hydrogen using the composite as described may be up to 1.87 times greater than using pure graphitic carbon nitride.

The composite as described provides several significant advantages as follows:

- Using natural (and otherwise waste) material as a precursor for preparation of the composite effectively reduces the cost of composite, as the precursor material (date palm syrup) is cheaper than mineral sources.
- Using biodegradable sources makes the photocatalyst partially biodegradable. This makes the composite more environment friendly.
- The ease of preparing the composite. The process of preparing the composite is a simple process and does not require heavy machinery or distillation processes, thereby reducing the overall time as well as the cost of the process.
- Using natural biodegradable ingredients makes the process more sustainable.
- The composite of the invention is able to provide a remarkable photocatalytic activity.

Other aspects and embodiments of the invention will be apparent as will be shown in the detailed description of the invention.

BRIEF DESCRIPTION OF THE DRAWINGS

The accompanying drawings illustrate non-limiting example embodiments of the invention

FIG. 4A—C 1s, FIG. 4B—O 1s, FIG. 4C—N 1s, and FIG. 4D-S2p

DETAILED DESCRIPTION

Figure 1:
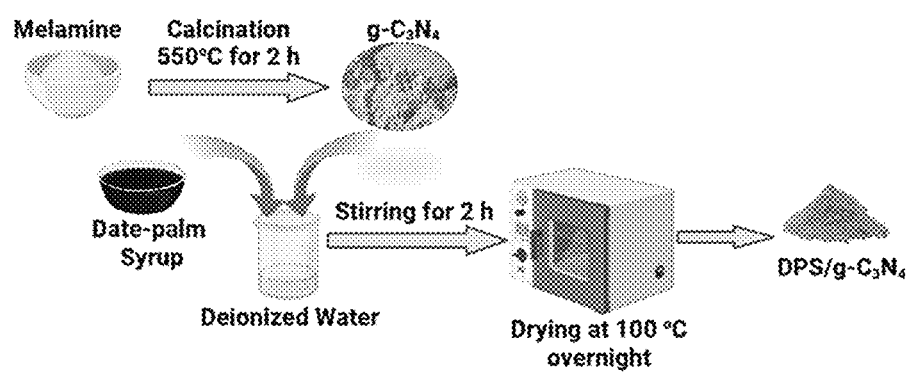
FIG. 1 illustrates a schematic diagram of the preparation of DPS/g-$C_3N_4$ composite FIG. 2A displays a X-ray diffraction (XRD) analysis of pure g-$C_3N_4$, pure DPS, and DPS/g-$C_3N_4$ composite samples FIG. 2B displays a Raman spectroscopy of DPS/g-C3N4 composite samples FIG. 3A displays a Scanning Electron Microscope (SEM) images of g-$C_3N_4$ FIG. 3B displays a SEM images 10% DPS/g-$C_3N_4$ composite, FIG. 3C displays a SEM images 50% DPS/g-$C_3N_4$ composite FIG. 3D displays an Energy-dispersive X-ray spectroscopy (EDS) analysis of g-$C_3N_4$, FIG. 3E displays an EDS analysis of 10% DPS/g-$C_3N_4$ composite FIG. 3F displays an EDS analysis of 50% DPS/g-$C_3N_4$ composite.

Throughout the following description, specific details are set forth in order to provide a more thorough understanding to a person skilled in the art. However, well known elements may not have been shown or described in detail to avoid unnecessarily obscuring the disclosure. The following description of examples of the invention is not intended to be exhaustive or to limit the system to the precise forms of any example embodiment. Accordingly, the description and drawings are to be regarded in an illustrative, rather than a restrictive sense.

According to an aspect of the invention, the process of preparing date palm syrup-graphitic carbon nitride composite comprises providing a graphitic carbon nitride, providing a date palm syrup, heating the graphitic carbon nitride, mixing the heated graphitic carbon nitride with the date palm syrup to form a mixture, drying the mixture to form the date palm syrup-graphitic carbon nitride composite. The mixing of the date palm syrup and the graphitic carbon nitride may be performed by any method known in the art such as pouring, stirring, agitation, vibrations etc.

Date palm syrup may be made by any of the known processes. One of the examples of making date syrup is as follows. Date palm fruits or dates are rinsed to remove impurities. The dates are then deseeded, and the deseeded mass is soaked in water to soften the fleshy mass of the dates. Depending on the size and variety of the dates, the dates may be chopped to fasten the process of softening the fleshy mass of the dates. The softened mass are then cooked with water until they are broken down to a thick mixture. This mixture is date syrup.

Some varieties of the dates have a naturally soft flesh and they therefore do not require soaking. Similarly, some date varieties have a high-water content in their fruits and therefore do not require water to be added while cooking. Also, in some cases, the date syrup may also be prepared by crushing the dates to form a thick mixture and cooking is not required.

The prepared date syrup may have certain amount of fibres and other lumps. These may be removed by straining. Alternatively, the entire mixture may be homogenised to form a smooth syrup.

It is noted that water has been mentioned as an example of a medium for soaking and cooking dates, Water may be replaced by other aqueous medium such as alcohol and the like.

The date palm syrup prepared may be a homogenous mixture or may have some lumps therein. The presence of lumps (or non-homogenous parts) in the date palm syrup does not the hinder the process of preparing the composite.

In the process of preparing the composite of the invention, the graphitic carbon nitride may be heated at a temperature of about 550° C. This process may also be termed as calcination. Calcination of the graphitic carbon nitride is carried out for activating the graphitic carbon nitride and to make it more receptable to forming a composite with the date palm syrup. The step of calcination would also enable removal of any impurities or volatile compounds adsorbed in the graphitic carbon nitride.

The calcinated graphitic carbon nitride is yellow in color. The calcinated graphitic carbon nitride may be ground to powder before mixing with the date palm syrup. In a power form, the surface area of the graphitic carbon nitride is increased, providing more area for the date palm syrup to react with the graphitic carbon nitride to form the composite.

The calcinated graphitic carbon nitride may be cooled before mixing the graphitic carbon nitride with the date palm syrup. The calcinated graphitic carbon nitride may be sufficiently cooled so that the date palm syrup does not disintegrate while contacting the calcinated graphitic carbon nitride.

In a separate embodiment, before mixing of graphitic carbon nitride with the date palm syrup, the graphitic carbon nitride or the date palm syrup may be mixed in an aqueous medium separately and thereafter the solutions of graphitic carbon nitride and the date palm syrup are mixed.

In an alternate aspect, the graphitic carbon nitride and the date palm syrup are mixed first and their mixture is then added to an aqueous medium.

Mixing with an aqueous medium is carried out to make a suspension, to enable easy mixing of graphitic carbon nitride and date palm syrup. Easy mixing of the graphitic carbon nitride and date palm syrup ensures greater contact between the graphitic carbon nitride and date palm syrup in the suspension thereby ensuring more composite is formed in the process.

The date palm syrup and the graphitic carbon nitride are so mixed such that the concentration of the date palm syrup in the final composite is in the region of 10% to 60%. More preferably, the date palm syrup may be mixed with the graphitic carbon nitride to make the concentration of the date palm syrup in the final composite in the region of 50%.

The next step in the process involves drying of the composite. The step of drying the composite may be carried out at 100° C. until the mixture is dried. Although 100° C. is provided as a preferred temperature, the temperature of drying may be adjusted so as to obtain complete removal of moisture without degeneration of the composite.

The drying may be carried out using any of the processes available in the art, such as a dehydrator, an oven, a dryer, etc. to name a few. The drying may be carried out in vacuum.

Drying the mixture will result in a dry powder composite which may be easily stored, transported and used. Further, it is noted that although it is preferred to have the composite in a powder form, the composite may also be in the form of pellets, granules and the like. Also, the composite may or may not be homogenous. The pellets and/or the granular form of the composite may be converted or broken into powder form using any of the known techniques.

FIG. 1 describes an example of preparing the composite. The DPS/g-$C_5N_4$ composite was prepared by calcinating a certain mass of g-$C_3N_4$ in a muffle furnace at 550° C. for 2 hrs. The yellow g-$C_3N_4$ product was obtained after cooling and grinding into fine powder. To prepare the DPS/g-$C_5N_4$ composite, the required amount of natural date-palm syrup from the local market was dissolved in 10 ml deionized water and after the addition of g-$C_3N_4$, the mixture was stirred for 2 h using a magnetic stirrer. The obtained homogenous solution was then dried in a vacuum oven at 100° C. overnight. The produced powder was named 10%, 20%, 30%, 40%, 50%, and 60% DPS/g-$C_5N_4$ according to the weight percentage of DPS in the composite.

The composite prepared may be used as a photocatalyst for hydrogen generation using water.

Structural Characterizations of the Composite

The crystalline structure was investigated through X-ray diffraction (XRD) using the Bruker Advance D8 diffractometer. Fourier-transform infrared spectroscopy (FTIR) spectra were obtained utilizing the PerkinElmer instrument. Raman analysis was explored using equipment from HORIBA Scientific (laser 532 nm). The morphology was investigated through Scanning electron microscopy with energy-dispersive X-ray spectroscopy (SEM/EDS).

Optical Characterizations

Diffusive reflectance spectra (DRS) at room temperature were recorded for the solid samples by utilizing an integrated sphere (SC-30) provided by the FS5 spectrometer (Edinburgh, UK). The diffusive spectra were then converted to the absorption spectra by using the Kubelka-Munk conversion (K–M=(1–R)2/2R). The reference polytetrafluoroethylene (PTFE) polymer was necessary to retrieve the band gap energy (Eg) for the solid samples using Eg=1240 eV nm $1^{-1}$, where I is the absorption edge (in nm).

The same FS5 spectrofluorometer (Edinburgh instrument, Livingston, UK) was used to record the photoluminescence (PL) spectra of the solid samples upon excitation by a xenon lamp.

The incorporation of SC-30 on the FS5 spectrometer is suitable to extract the absolute photoluminescence (PL) quantum yield (QY) measurements (PLQY) for the solid samples while comparing the measured direct and indirect emission from the sample to that generated from the PTFE reference through direct excitation. The error is 2% of the estimated experimental value.

Excited-State PL lifetime measurements and time-resolved photoluminescence (TRPL) measurements were obtained. Using another Edinburgh instrument (LifeSpec II spectrometer, Livingston, UK), it was possible to collect the PL monitored at 442 nm as a function of time when a time-correlated single-photon counting (TCSPC) unit was exploited in the instrument, which is also equipped by a picosecond diode laser to excite the solid samples at 375 nm. The repetition rate of the source was 20 MHz, and the detector selected was a Hamamatsu-made photomultiplier tube (H5773-04) that is a red-sensitive, high-speed detector. A total count rate of 10,000 counts/s was collected. Levenberg-Marquardt algorithm to minimize $X^2$ is the routine procedure that was also used here to convolute the final decay data with instrument response function (IRF), utilizing a three-exponential model function, eventually calculating the average lifetime value. The formula used in the calculation were as follows:

$$\bar{\tau} = \sum_i f_i \tau_i \quad (1)$$

$$f_i = \frac{\alpha_i \tau_i}{\sum_j \alpha_j \tau_j} \quad (2)$$

Where Ti are the lifetimes with amplitudes ai and Y=1.0, and i is the contribution of each component to the steady-state intensity. The sum in the denominator is for all the decay times and amplitudes. The error was determined to be 2% for less than one nanosecond and 20% for a lifetime of around five nanoseconds. All PL and TRPL measurements in the solid state were conducted at 298 K by using a Peltier system with an accuracy of ±0.1° C.

Electrochemical properties measurements were obtained. A standard three electrode cell and a Wuhan Corrtest Instruments Corp. Ltd. CS350 electrochemical workstation were used for investigating the electrochemical impedance spectroscopy (EIS) and cyclic voltammetry (CV). Ag/AgCl was used as the reference electrode, Pt mesh was used as the counter electrode, and 0.2 M $Na_2SO_4$ solution was used as the electrolyte. The catalyst-based thin film was placed to the surface of the FTO glass working electrode. The preparation of the working electrode was as follows: 0.1 g of catalyst was added to 0.015 g conductive carbon and 0.005 g Polyvinylidene fluoride (PF), dispersed in 0.5 ml N-methyl-2-pyrrolidone (NMP) and mixed well to get a homogenized thick slurry, which was uniformly coated over the FTO glass and was dried at 80° C. Electrochemical impedance spectrum (EIS) was carried out in the frequency range of 0.01 Hz to 100 kHz and the cyclic voltammetry (CV) analysis was conducted under the potential range of –0.2-1 V.

Structural Characterizations

Figure 2A:
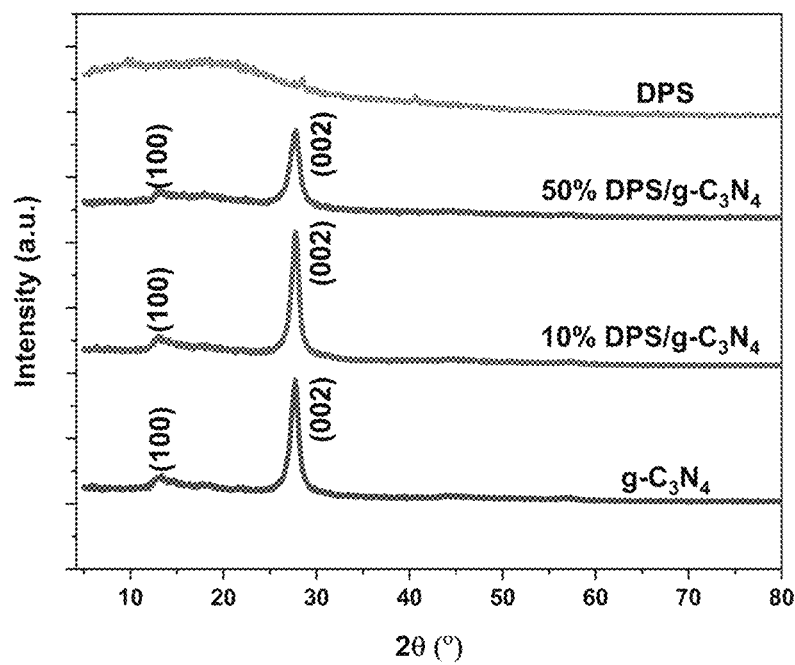

A comprehensive characterization was conducted on the material's structure, morphology, crystallinity, charge separation capability, and light absorption. To obtain the crystalline structure and phase composition of the synthesized date-palm/g-$C_3N_4$ composite, X-ray diffraction (XRD) within a 2θ range of 5-80° was carried out for pure g-$C_3N_4$, 10% DPS/g-$C_5N_4$ composite, and 50% DPS/g-$C_5N_4$ composite, and results are presented in FIG. 2A. FIG. 2A illustrates two diffraction peaks at angle 2θ of 13.4° and 27.7° which can be indexed to the (100) and (002) crystal planes and correspond to the in-plane repeating motifs of the continuous heptazine network and the hexagonal phase of g-$C_3N_4$, respectively. Upon integration with DPS, the characteristic diffraction peaks of the pure g-$C_3N_4$ do not undergo significant alterations. 10% DPS/g-$C_5N_4$ composite, and 50% DPS/g-$C_5N_4$ composite have the same two characteristic peaks of pure g-$C_3N_4$, however, there is decrease in the intensity of the (002) peak from 3792 for g-$C_3N_4$ to 2748 for 50% DPS/g-$C_5N_4$ composite which presumably due to the addition of DPS and indicating that the structure has changed. The absence of any other impurity peaks implies that the composite was successfully prepared.

Figure 2B:
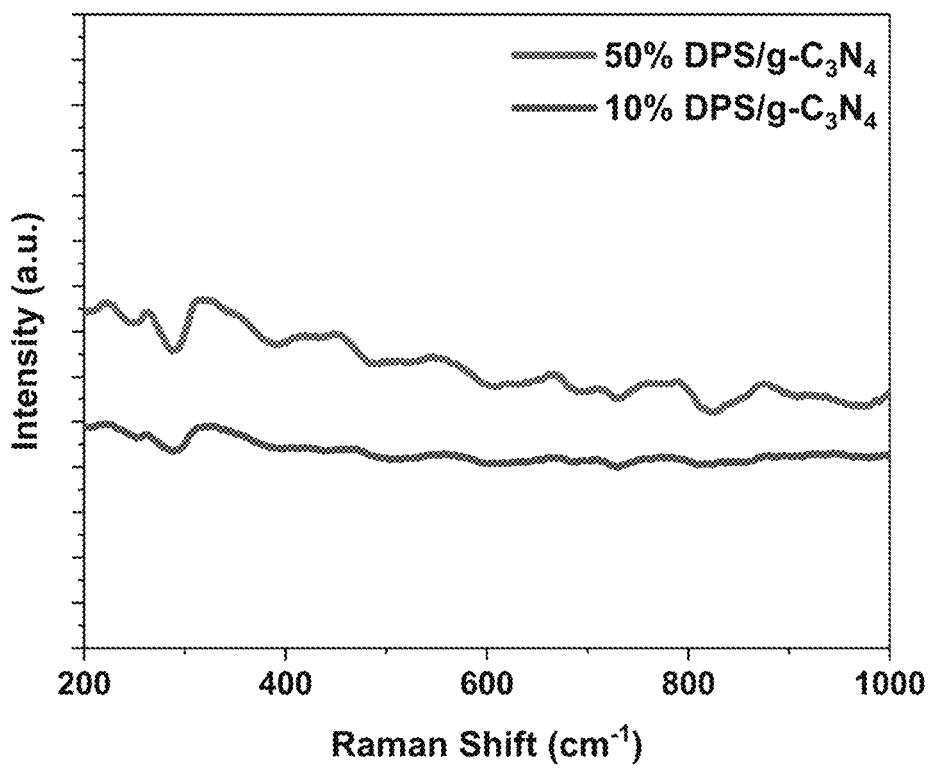
Figure 3A:
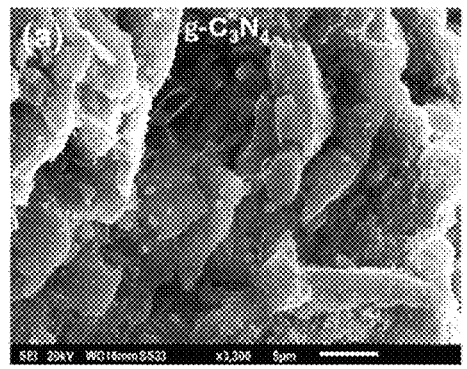
Figure 3D:
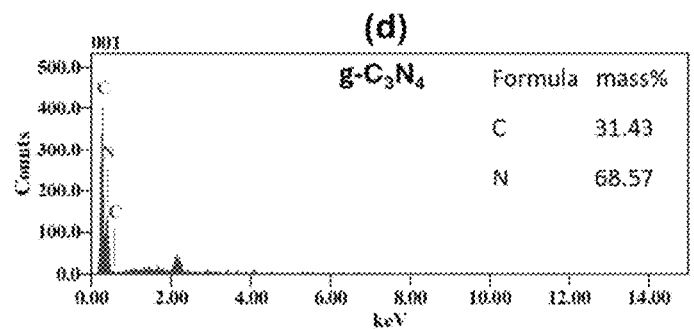
Figure 3B:
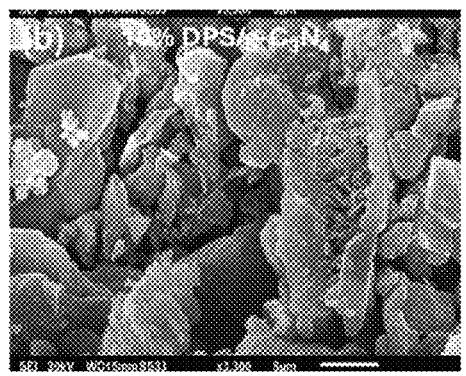
Figure 3E:
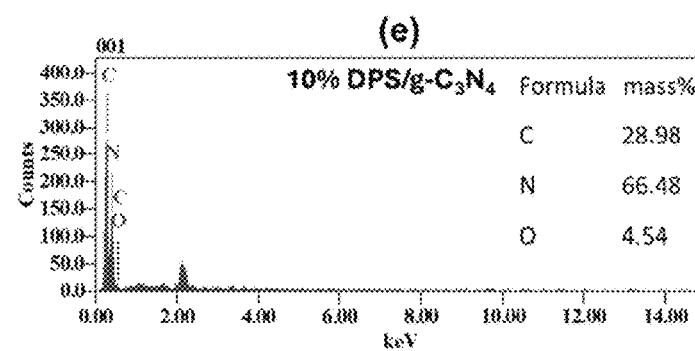
Figure 3C:
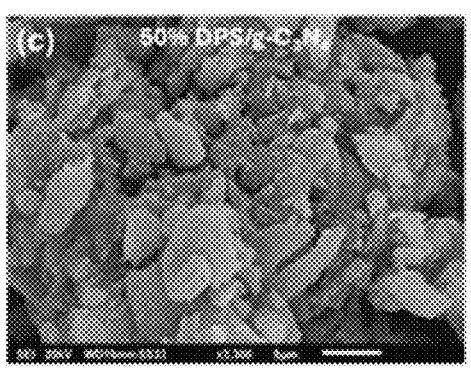
Figure 3F:
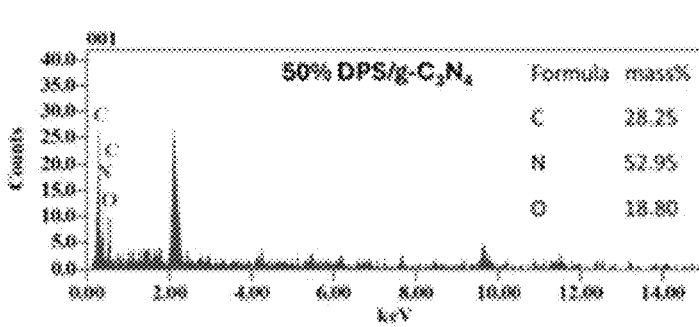

The Fourier-transform infrared spectroscopy (FTIR) analysis of pure g-$C_3N_4$, 10% DPS/g-$C_5N_4$ composite, and 50% DPS/g-$C_5N_4$ composite samples. Regarding g-$C_3N_4$, the s-triazine ring modes are represented by the band at 804 $cm^{-1}$, while the aromatic C—N heterocyclic structure is indicated by bands at 1240-1630 $cm^{-1}$. The wide peak at 3200 $cm^{-1}$ may be attributed to N—H stretches. The peak intensity of the g-$C_3N_4$ at 804 $cm^{-1}$ decreases with increasing DPS amount in the 10% DPS/g-$C_5N_4$ composite, and 50% DPS/g-$C_5N_4$ composite samples. Additional examination was carried out using Raman analysis on g-$C_3N_4$ loaded with 10% and 50% DPS and results are displayed in FIG. 2B. Pure g-$C_3N_4$ exhibits typical distinct peaks, located at 598.34, 679.66, 785.92, 889.73, and 989.72 $cm^{-1}$. These peaks represent the C—N vibration modes of heterocycles as confirmed by FTIR results. Peaks at 679.66 and 989.72 $cm^{-1}$ demonstrated the existence of heptazine ring structure. All observed peaks remained in place in the Raman spectra of both 10% and 50% DPS/g-$C_5N_4$ composite, elucidating that the basic framework of g-$C_3N_4$ remained unaltered despite being loaded with DPS.

Using Scanning Electron Microscope (SEM), morphological and structure characteristics of pure g-$C_3N_4$, 10% DPS/g-$C_5N_4$ composite and 50% DPS/g-$C_5N_4$ composite were examined in FIG. 3A to 3F. Pure g-$C_3N_4$ exhibits irregular-shaped bulk solid agglomerates. However, while the irregular lumped structure is still existing in the 10% and 50% DPS/g-$C_5N_4$ composite samples, the number of lumps and agglomerates increased and their size became smaller, confirming the integration of DPS on g-$C_3N_4$.

The successful integration of DPS on g-$C_3N_4$ may be confirmed from the Energy-dispersive X-ray spectroscopy (EDS) results and is displayed in FIG. 3A to 3F. EDS results show the presence of a significant content of oxygen (18.80%) in 50% DPS/g-$C_5N_4$ sample. The origin of this oxygen can be traced back to the natural sugars present in the DPS. Oxygen content existed in lower percentage (4.54%) in the 10% DPS/g-$C_5N_4$ composite sample confirming that increased DPS percentage resulted in higher content of oxygen. The appearance of oxygen in the DPS/g-$C_5N_4$ composite also suggests that the mass percentages of carbon and nitrogen has been reduced and vacancies have been produced in the g-$C_3N_4$ structure. The 10% and 50% DPS/g-$C_5N_4$ composite samples exhibit lower nitrogen content (66.48% and 52.95%, respectively) compared to 68.57% in the pure g-$C_3N_4$. Similarly for carbon, its mass percentage has decreased from 31.43% for pure g-$C_3N_4$ to 28.98% and 28.25% for 10% and 50% DPS/g-$C_5N_4$ composite, respectively. The reduction in nitrogen content is greater than the reduction in carbon content which confirms that carbon contained in the sugar-rich DPS maintained the overall carbon mass percentage of the composite.

Figure 4A:
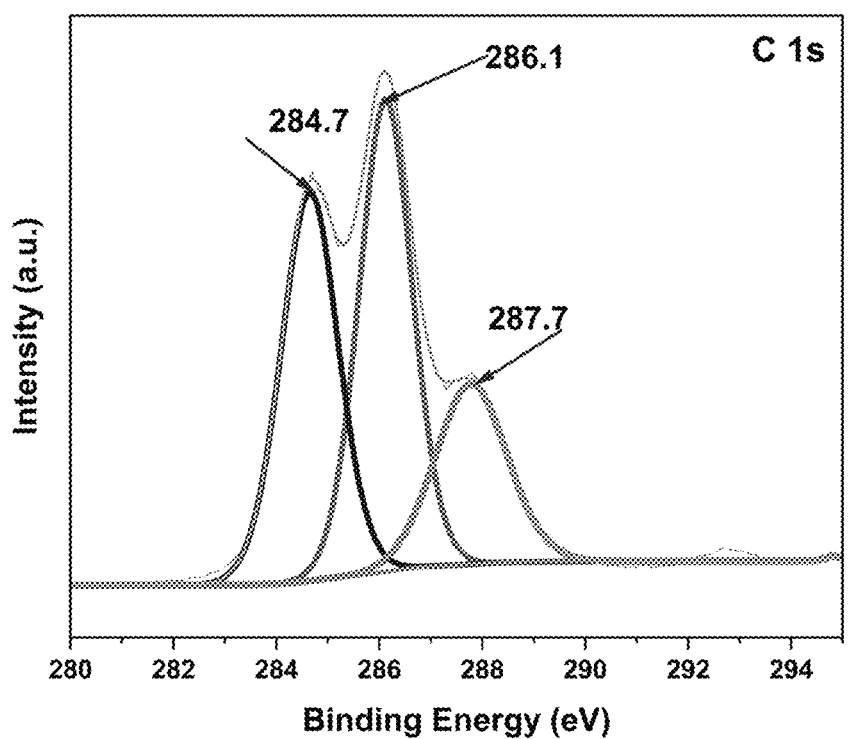
FIG. 4A-4D displays a XPS spectra of pure g-$C_3N_4$, pure DPS, and DPS/g-C3N4 composite samples.
Figure 4B:
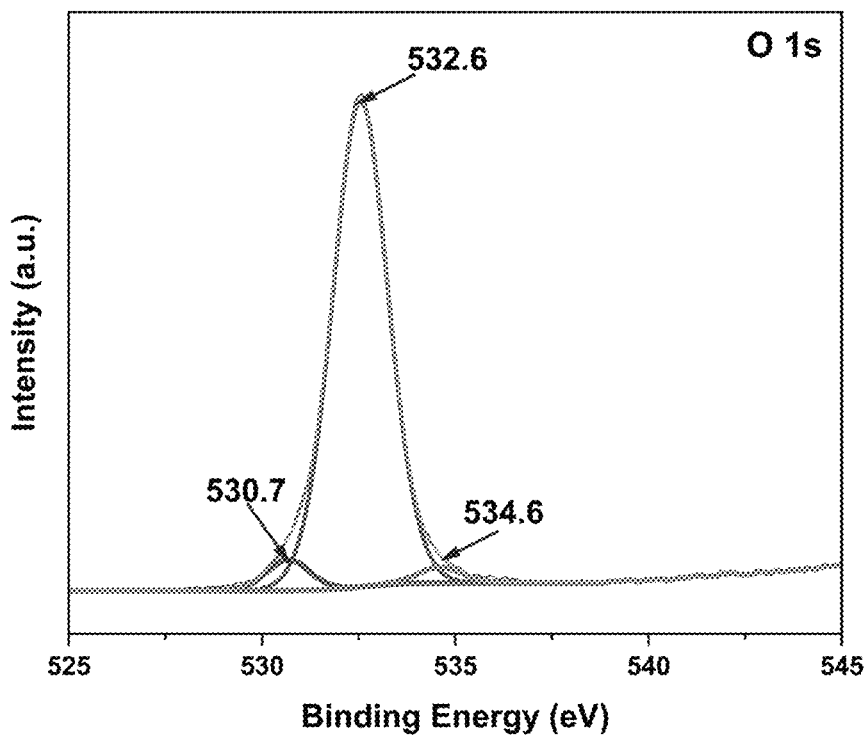
Figure 4C:
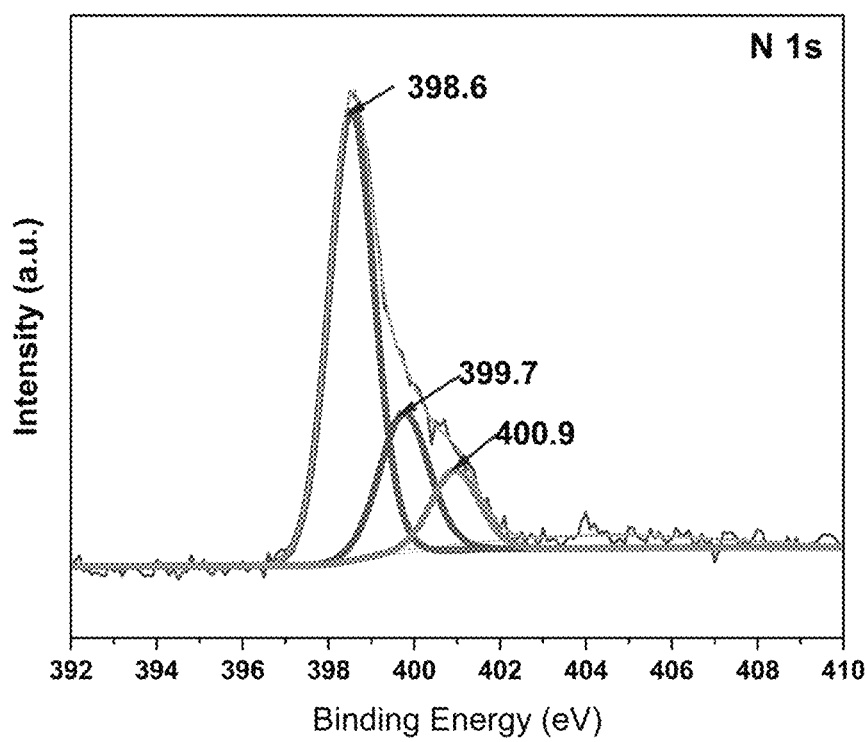
Figure 4D:
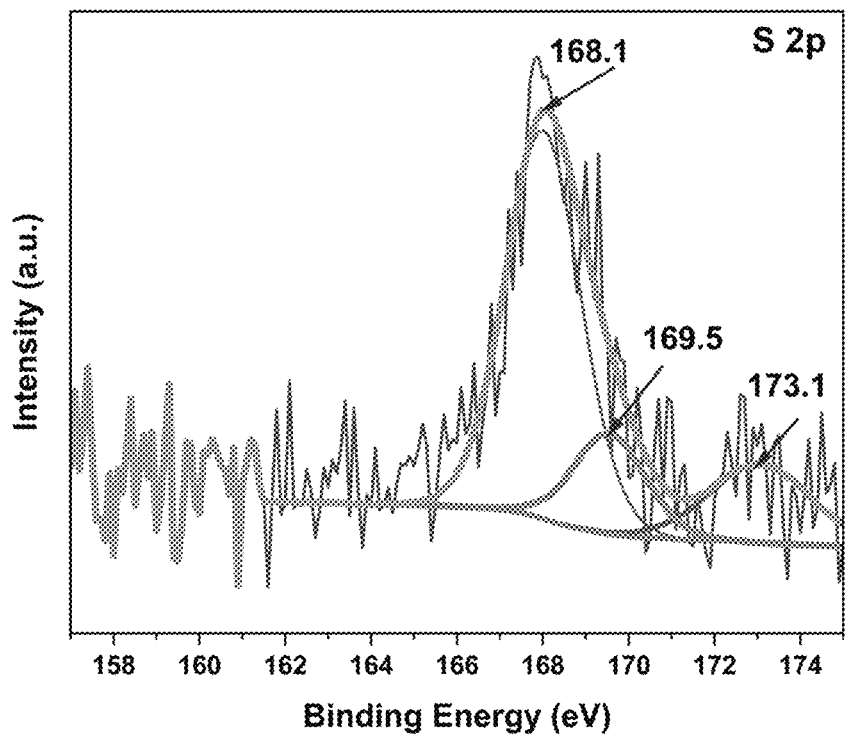

X-ray photoelectron spectroscopy (XPS) analysis was performed to confirm the bonding configuration and elemental composition of the pure g-$C_3N_4$, pure DPS, and DPS/g-$C_5N_4$ composite samples. The results of the XPS analysis are displayed in FIG. 4A to 4D. The elements S, O, N, and C are confirmed to be present in the XPS survey spectrum. The corresponding percentages of S, N, O, and C are 0.26%, 6.51%, 33.09%, and 60.14%. High-resolution XPS spectra of C 1s are shown in FIG. 4A, with binding energies of 284.7 eV, 286.1 eV, and 287.7 eV, which correspond to C—C, C—O, and O—C=O, in that order. FIG. 4B shows high-resolution spectra of O 1s with binding energy 532.6 eV, attributed to surface-adsorbed $H_2O$. The N 1s spectra from FIG. 4C shows mainly one peak at 398.5 eV referring to C—N=C. S 2p with binding energy 167.9 eV, which corresponds to a higher oxidation state of sulfur (—$SO_3H$), is displayed in FIG. 40. Dates contain potassium, sodium, sulfur, selenium, zinc, cobalt, copper, magnesium, manganese, iron, and phosphorus. The presence of all these elements in the 50% DPS/g-$C_5N_4$ composite has been confirmed through XPS analysis. These results collectively verify that the DPS/g-$C_5N_4$ composite was successfully fabricated. Sulfur doping is advantageous for effective charge carrier separation qualifying it for enhanced solar energy conversion. The use of sulfur in photocatalyst composites to improve performance is verified. The sulfur-doped porous carbon nitride material has been observed to improve the photocatalytic hydrogen production. The addition of sulfur dopants to carbon nitride enables significant adjustment of the valence and conduction band locations which enhanced optical absorption in the visible light region.

The enhanced photocatalytic activity for hydrogen production may be attributed to sulfur, and oxygen doping and the simultaneous vacancy generation in the structure of g-$C_3N_4$ resulted from the inclusion of DPS which led to enhanced charge separation, modified band structure, and the creation of more active sites to absorb the electrons and speed up the process of producing $H_2$.

Figure 5A:
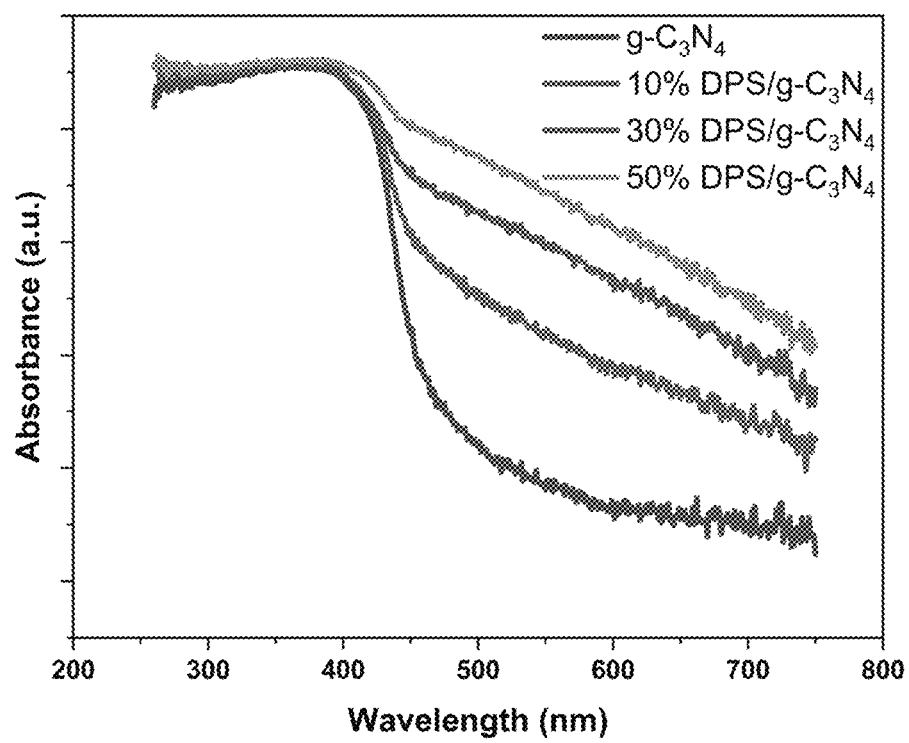
FIG. 5A illustrates an UV-solid spectra manifested by the Kubelka-Munk function and the corresponding Tauc plots for g-$C_3N_4$ and DPS/g-$C_3N_4$ composite samples at 298 K utilizing direct optical measurements on an integrated sphere FIG. 5B displays a change in the colors of DPS/g-$C_3N_4$ composite samples under day light.
Figure 5B:
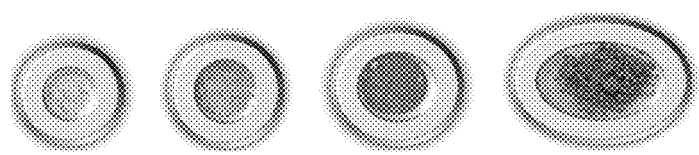
FIG. 5C illustrates a Kubelka-Munk spectra for band gap energy calculation of g-$C_3N_4$ sample
FIG. 5D illustrates a Kubelka-Munk spectra for band gap energy calculation of 50% DPS/g-$C_3N_4$ composite sample
FIG. 5E illustrates a Photoluminescence excitation (PLE) and Photoluminescence (PL) spectra of g-$C_3N_4$ and DPS/g-$C_3N_4$ composite samples at 298 K (the monitoring excitation and emission wavelengths are shown directly in the graphs)
Figure 5C:
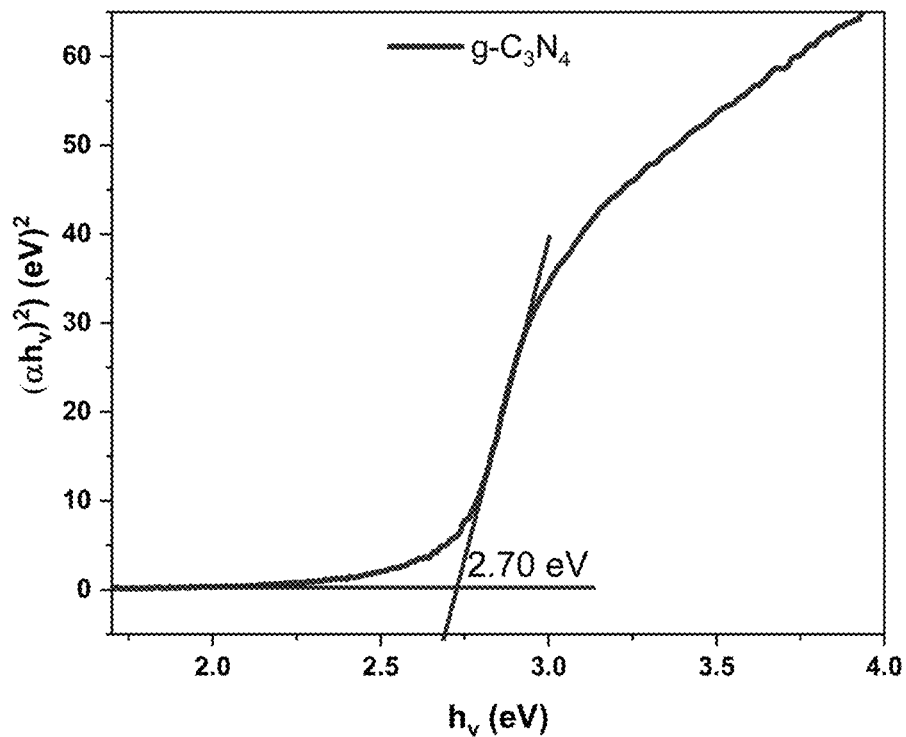
Figure 5D:
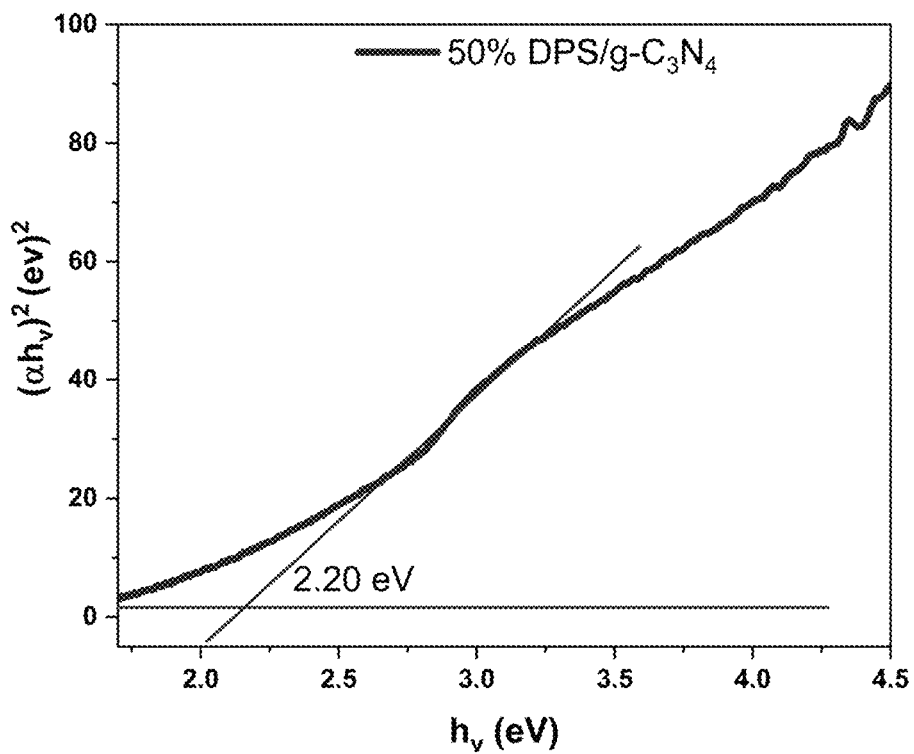

The $E_g$ values for the pure g-$C_3N_4$ and DPS/g-$C_5N_4$ composite samples at 298 K were retrieved. FIG. 5A and the results demonstrate a smooth trend in the UV solid data upon changing the solid structure from pure g-$C_3N_4$ to 50% DPS/g-$C_5N_4$ composite with a systematic decrease in the band gap, which supports generating new extrinsic bands upon the addition of the date palm syrup with a gradual shift from yellow to brown colors under day light as provided in FIG. 5B and potentially a band-to-band transfer. The band gap as provided in FIG. 5C and FIG. 50) has decreased from around 2.7 to 2.2 electron volts (eV) in going from pure g-$C_3N_4$ to 50% DPS/g-$C_3N_4$. Compared to pure g-$C_3N_4$, DPS/g-$C_5N_4$ composites exhibited higher and wider absorption peaks ranging in both UV and visible light regions. As DPS percentage increases, the light absorption increases as well. 50% DPS/g-$C_3N_4$ composite photocatalyst displayed the highest absorption compared to all samples. This enhancement in light absorption may be mainly attributed to morphological alterations resulting from incorporating DPS with g-$C_3N_4$.

Figure 5E:
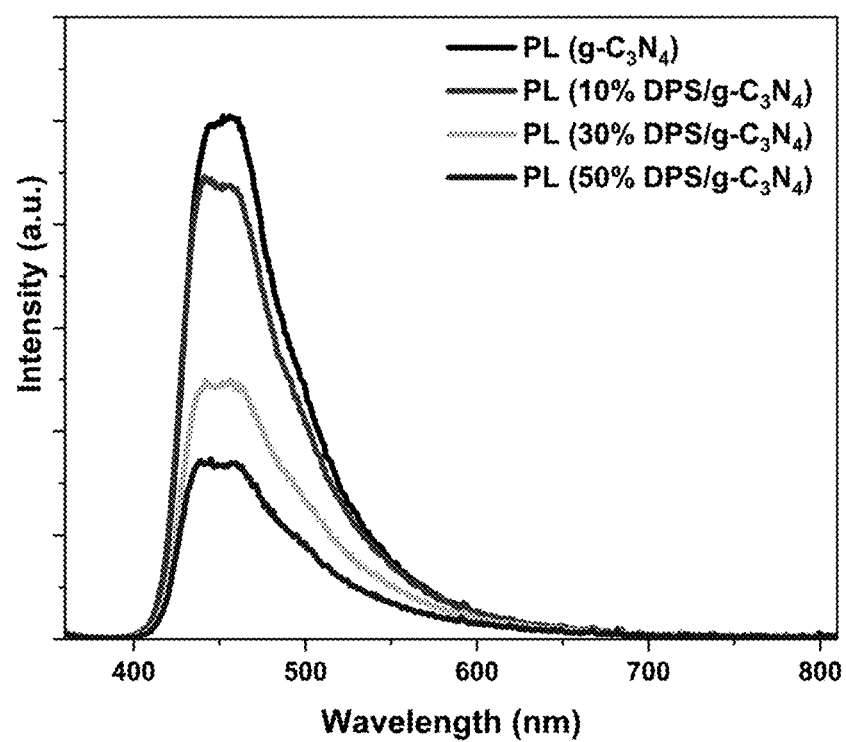

The onset wavelength of the absorption edge of pure g-$C_3N_4$ (the intrinsic semiconductor) matches the observed maxima in the measured photoluminescence (PL) spectrum as seen in FIG. 5E. The same data were found to be consistent with the corresponding photoluminescence-excitation (PLE) spectrum. The peak at 442 nm corresponds to the radiate recombination of the free charge carriers (FC). PL enables understanding the trapping, migration and electron-hole pair recombination of the photocatalyst. Higher peak intensity of the photoluminescence spectrum corresponds to rapid recombination rates of electrons and holes, resulting in reduction of the photocatalytic performance. A prominent fluorescence emission peak was seen in pure g-$C_3N_4$, indicating photogenerated carriers recombining rapidly in the band-to-band transition. The PL intensity was observed to decrease when 10, 30 and 50 wt % DPS was applied across the g-$C_3N_4$ surface. This confirms that DPS may trap electrons and stop photoinduced electrons and holes from recombining on the DPS/g-$C_5N_4$ composite surface. The discrete decrease in PL intensity in going from pure g-$C_3N_4$ to 50% DPS/g-$C_5N_4$ composite sample warrants a more absolute measurements of the absolute photoluminescence quantum yield (PLQY) to confirm the trapping of the FC by the trapped centres (TC) of g-$C_3N_4$. The PLQY of the emission peaks at 442 nm emerged in the PL spectra of all samples when excited at 375 nm was found to gradually decrease for pure g-$C_3N_4$ as illustrated in FIG. 6A to 6D upon modifying with date palm syrup (composite samples), also in agreement with the decrease in the band gaps, also confirming the trapping of charge carrier by the doped impurities.

Figure 6A:
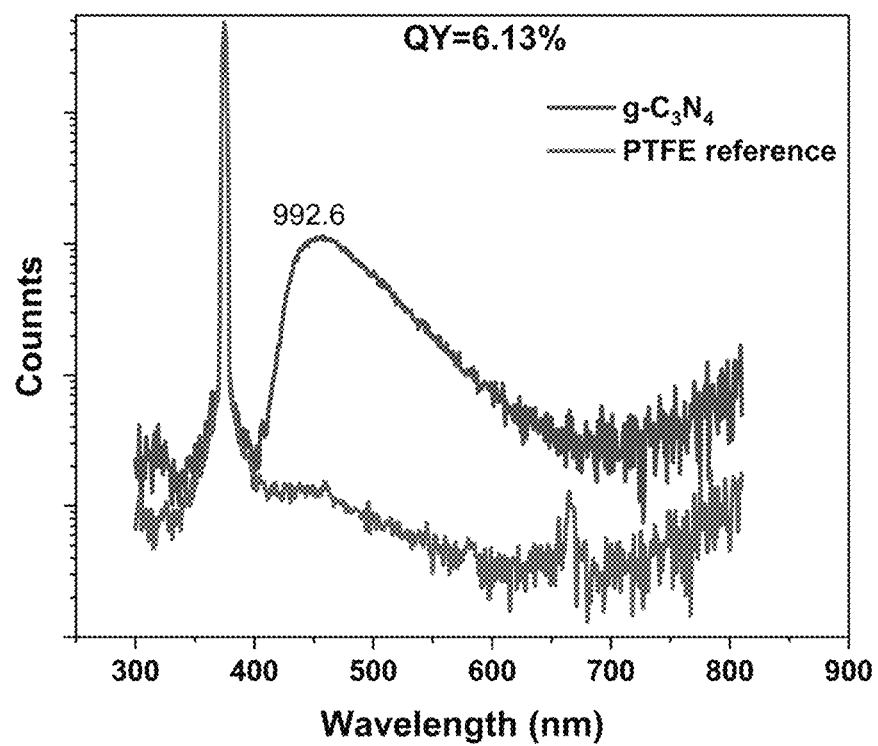
FIG. 6A to FIG. 6E illustrates the Photoluminescence quantum yield (PLQY) data. PLQY date of g-$C_3N_4$ in FIG. 6A, 10% DPS/g-$C_5N_4$ composite in FIG. 6B, 30% DPS/g-$C_5N_4$ composite in FIG. 6C, 50% DPS/g-$C_5N_4$ composite in FIG. 6D at 298 K, and an estimated average excited-state lifetimes of g-$C_3N_4$ and DPS/g-$C_5N_4$ composite samples in FIG. 6E
Figure 6B:
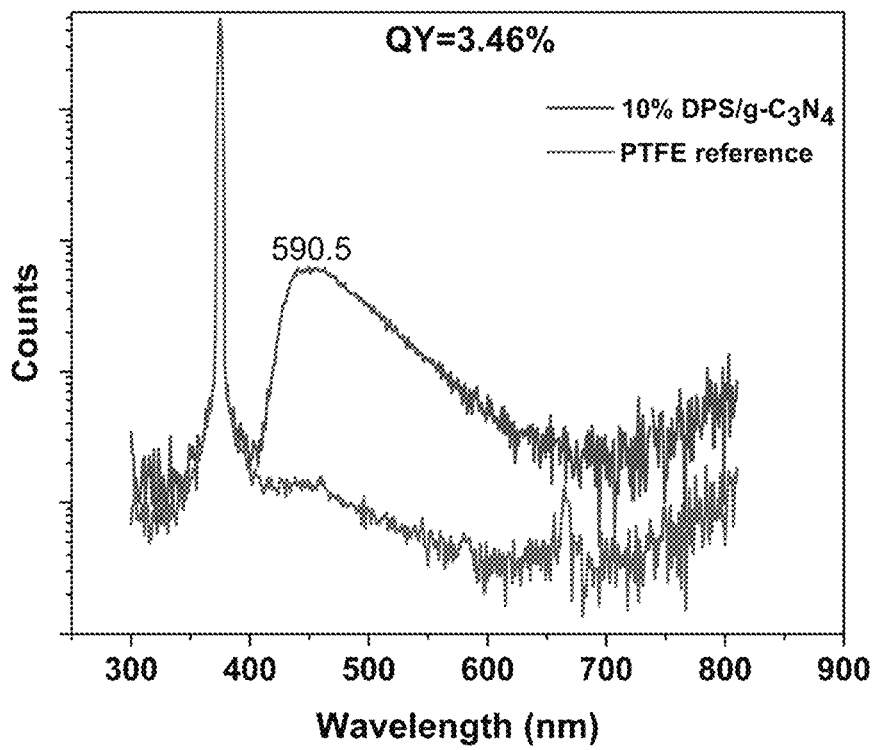
Figure 6C:
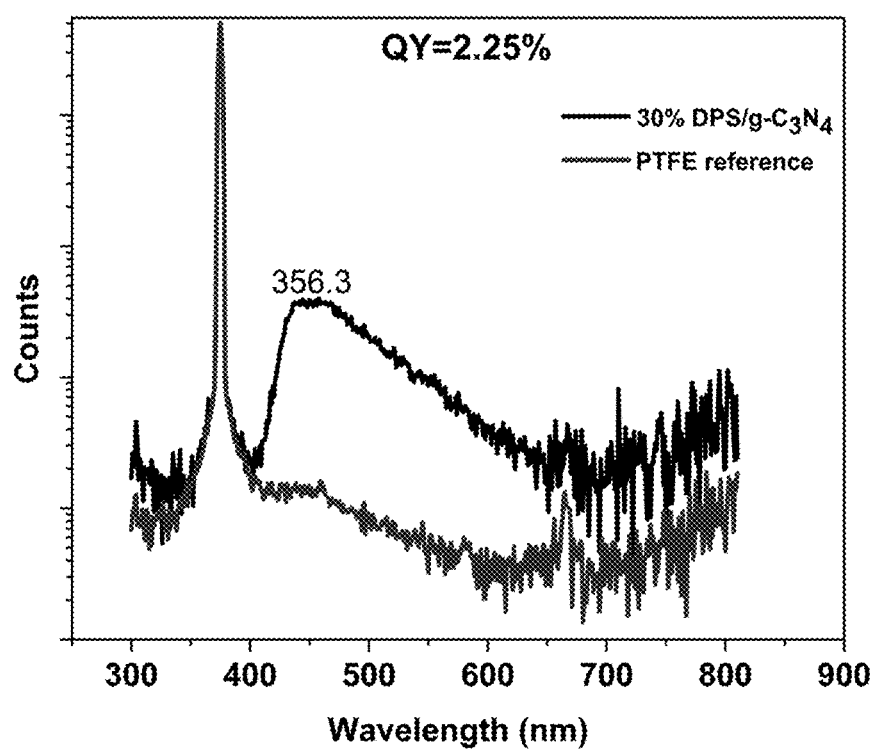
Figure 6D:
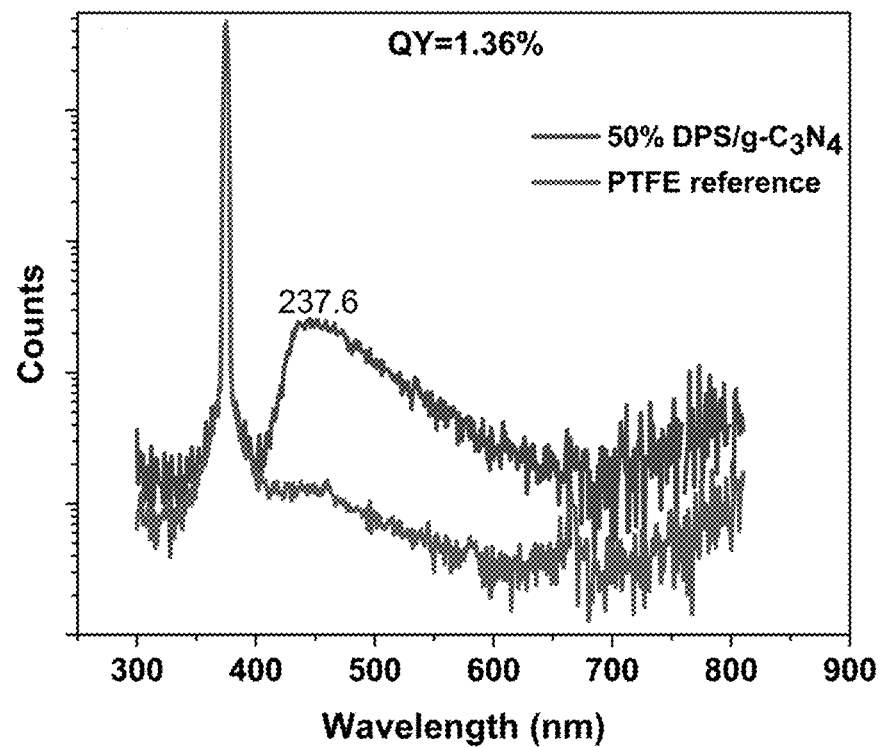
Figure 6E:
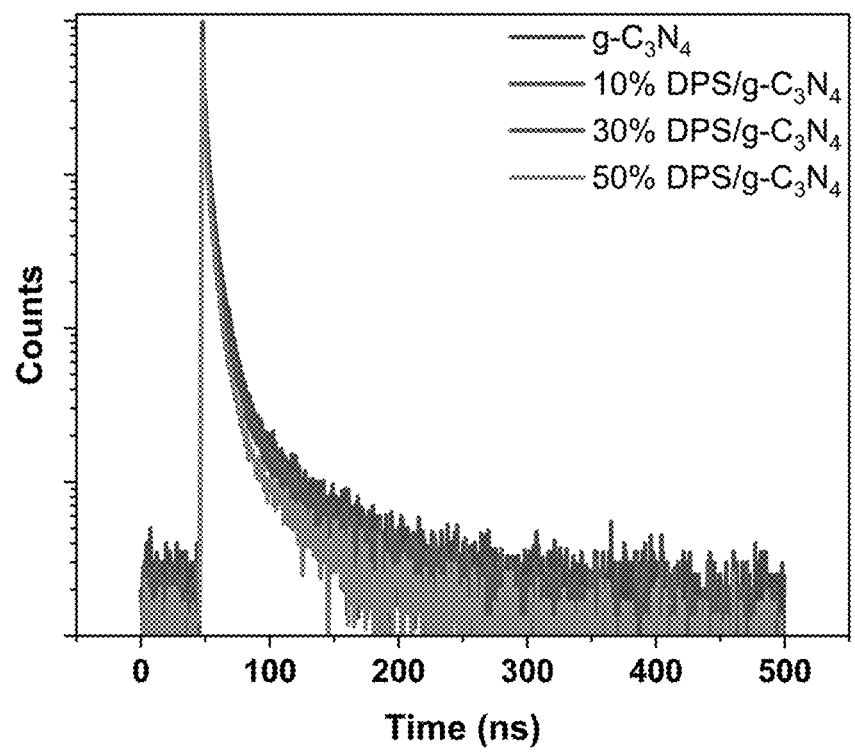

From FIG. 6E the trend in the estimated average excited-state lifetimes values retrieved from the measured PL decays that support the trapping mechanism of the undoped excitation, or the FC is observed. The presence of more than one lifetime component is unsurprising as multiple exciton generation (MEG) phenomena is displayed by the pure g-$C_3N_4$ and composite samples. Each lifetime component is then associated with a specific extrinsic center (EC) because of the microheterogeneity of the solid samples. Table 1 confirms that each lifetime component along with the average value has decreased because of the generation of a new non-radiative decay channel by the trapping mechanism of the isolated exciton. The optical behavior and the global fitting of the exciton dynamics best rationalizes the best performance of 50% DPS/g-$C_5N_4$ composite having the lowest extrinsic band gap, PLQY, and the shortest average lifetime values in generating hydrogen as demonstrated below among other composite samples.

Table. 1 describes the excited-State PL lifetime measurements and time-resolved photoluminescence (TRPL) measurements of DPS/g-$C_5N_4$ composite samples

TABLE 1

| Sample | $\tau_1$ (ns) | $F_1$ % | $\tau_2$ (ns) | $F_2$ % | $\tau_{2\ 3}$ (ns) | $F_3$ % | $\tau_{avg}$ (ns) |
|---|---|---|---|---|---|---|---|
| g-$C_3N_4$ | 2.35 | 0.45 | 8.28 | 0.46 | 62.27 | 0.09 | 10.4706 |
| 10% DPS/g-$C_3N_4$ | 2.19 | 0.48 | 7.79 | 0.43 | 52.11 | 0.08 | 8.5697 |
| 30% DPS/g-$C_3N_4$ | 1.97 | 0.54 | 7.51 | 0.38 | 51.5 | 0.08 | 8.0376 |
| 50% DPS/g-$C_3N_4$ | 1.81 | 0.52 | 6.85 | 0.41 | 49.82 | 0.06 | 6.7389 |

Electrochemical Characterizations

Figure 7A:
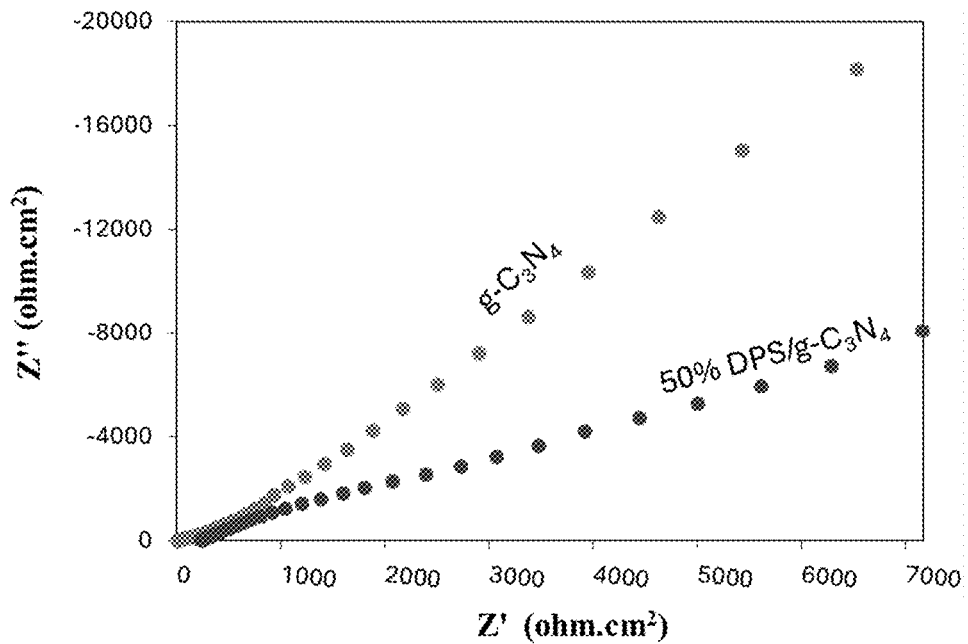
FIG. 7A illustrates Nyquist electrochemical impedance spectroscopy plots of pure g-$C_3N_4$ and 50% DPS/g-$C_3N_4$ composite
Figure 7B:
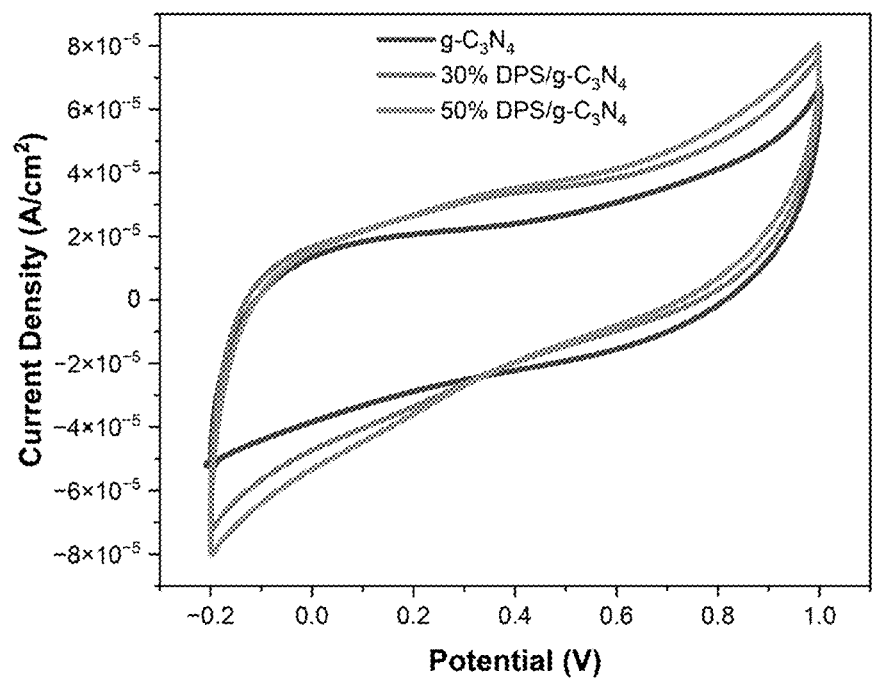
FIG. 7B illustrates cyclic voltammetry (I vs E) of pure g-$C_3N_4$ and 50% DPS/g-$C_5N_4$ composite.

Electrochemical impedance spectroscopy (EIS), the real Z' and the imaginary Z" of impedance at various frequencies are determined. This is done by measuring the phase angle of the impedance as a function of the frequency of the sinusoidal potential wave applied to an electrochemical system. A drop in the Nyquist semicircle frequency indicates a larger current and lower resistance in the material at the interface and surface. Stronger charge transfer capabilities and a smaller charge-transfer resistance are indicated by a smaller semicircle diameter. Results of electrochemical impedance spectroscopy investigations of pure g-$C_3N_4$ and DPS/g-$C_5N_4$ composites containing different DPS wt % are shown in FIG. 7A. The g-$C_3N_4$ has large impedance which is indicative of limited photoinduced charge carrier migration and separation efficiency. In contrast, 50% DPS/g-$C_5N_4$ composite sample shows significantly smaller impedance curve compared to pure g-$C_3N_4$, indicating a considerable drop in the charge transfer resistance and higher photogenerated charge separation efficiency as a result of presence of DPS in the composite. Another effective method for examining the electrochemical behavior is cyclic voltammetry (CV). This method determines the current (I) changes of a redox active mixture in response to a linearly cyclic potential sweep among two or more predetermined values. FIG. 7B shows the CV performance of g-$C_3N_4$ and 50 DPS/g-$C_5N_4$ composite. DPS/g-$C_5N_4$ composite exhibited higher response currents in comparison with pure g-$C_3N_4$. This suggests improved oxidation and reduction capacity and electro-catalytic ability of DPS/g-$C_5N_4$ composites resulting in efficient charge carrier separation.

In a second aspect of the invention is provided a method of generating hydrogen from water. The method comprises providing water, providing a date palm syrup-graphitic carbon nitride composite and contacting the date palm syrup-graphitic carbon nitride composite with water in presence of light for generating hydrogen. The step of contacting may be performed by pouring one component over another, mixing the two components, etc. Other techniques such as stirring, agitation or vibrations may also be used.

The water that may be used for hydrogen generation may be obtained from any sources such as desalinated water, sea water, deionised water, recycled water, ocean water, brackish water, ground water and wastewater. Further, water from different sources may be combined and used together for hydrogen evolution.

An electron donor may be added to the mixture of date palm syrup-graphitic carbon nitride composite with water. This electron donor is also known as sacrificial agent that helps in increasing the hydrogen generation. Non-limiting examples of sacrificial agents include glycerol, methanol, ethanol, etc. The effect of electron donor on hydrogen generating will be described further in the section, "Effect of electron donor/sacrificial agent"

When a deionised water is used for hydrogen generation, it is found that addition of salts such as NaCl will increase the hydrogen generation. The effect of addition of salt on hydrogen generating will be described further in the section, "Effect of NaCl concentration". It is to be noted that NaCl is used as an example for illustrating the effect of salt on Hydrogen generation. Other salts may also be used in the invention; however, the effect may vary.

The process of generating hydrogen by date palm syrup-graphitic carbon nitride composite with water is an exothermic process. It is therefore important to be able to control the temperature of the reaction during hydrogen generation. Uncontrolled increase in temperature will have degenerative effect on the composite and will therefore decrease hydrogen generation.

The temperature control of the reaction may be done by any available means. Non-limiting examples of such means include using cooling and heating jackets. In some embodiments, the cooling and heating jackets may have sensors which may be configured to detect the reaction temperature and allow for cooling or heating of the reactants, as applicable.

By the method as described it the second aspect, contacting the date palm syrup-graphitic carbon nitride composite with water in presence of light may enable hydrogen evolution in concentration of about 3034.6 μmol $g^{-1}$ to about 7434.6 μmol $g^{-1}$.

Photocatalytic Performance

Figure 8A:
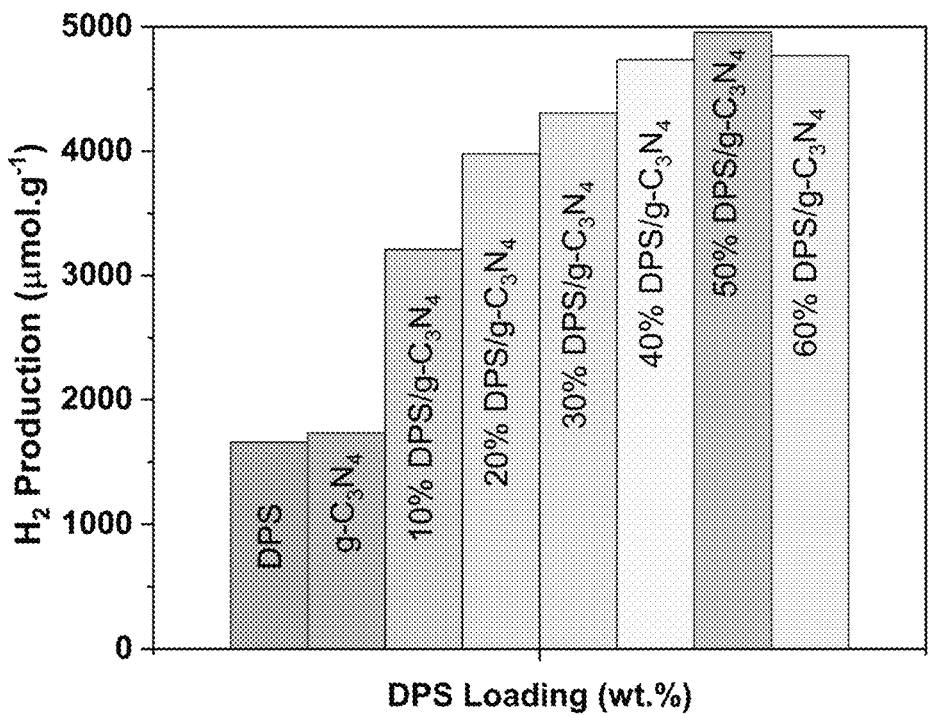
FIG. 8A illustrates the effect of DPS loading (conditions: 25 mg of catalyst, 5% methanol, 80 min)

Effect of DPS loading—To evaluate the photocatalytic capability of DPS loaded on g-$C_3N_4$ in water splitting for hydrogen evolution, 25 mg of the composite including varying percentages of DPS was mixed with a 50 ml of 5% methanol solution within a water medium. Methanol solution serving as a sacrificial agent. The results of $H_2$ generation using different DPS loadings on g-$C_3N_4$ are shown in FIG. 8A. Using pure DPS as a photocatalyst resulted in $H_2$ generation of 1735.44 μmol $g^{-1}$ which is 34.44% lower than the production of $H_2$ using pure g-$C_3N_4$. However, when DPS was incorporated with g-$C_3N_4$, the amount of produced $H_2$ was increased, and increasing DPS wt % in the composite resulted in enhancing $H_2$ yield. This trend continued from 50 wt % DPS was reached; beyond this percentage the amount of generated $H_2$ decreased. 10% DPS/g-$C_3N_4$ composite photocatalyst generated 3034.6 μmol $g^{-1}$. This yield of $H_2$ is 1.15-fold the $H_2$ yield using pure g-$C_3N_4$. 50% DPS/g-$C_3N_4$ composite photocatalyst which is considered as the composite with the highest $H_2$ production, yielded 4956.8 μmol $g^{-1}$ (1.87 times $H_2$ yield using pure g-$C_3N_4$).

The boosted $H_2$ yield can be attributed to oxygen doping and the simultaneous vacancy generation in the structure of g-$C_3N_4$ resulted from the inclusion of DPS. Oxygen doping enhances charge separation in the bulk phase, modifies the band structure, and causes spin polarization, while vacancies can modify the electrical band structure of g-$C_3N_4$ by adding new energy levels to the band gap, which would extend the light absorption region. The DPS/g-$C_3N_4$ composite showed enhanced charge carrier separation and transfer as well as reduced recombination probabilities.

Effect of Electron Donor/Sacrificial Agents

Figure 8B:
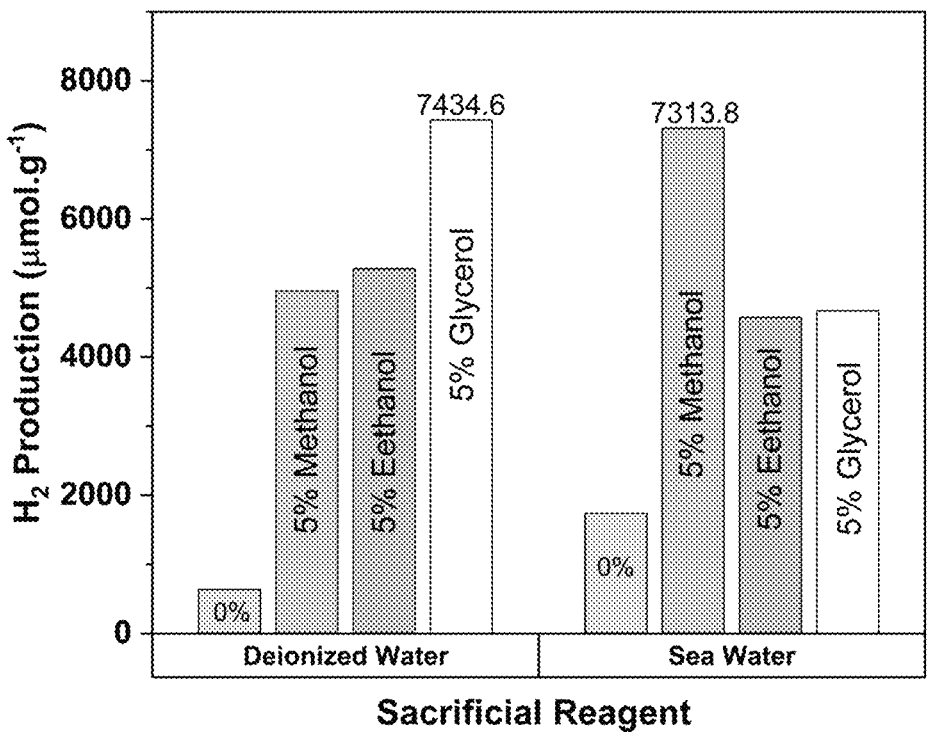
FIG. 8B illustrates the effect of different sacrificial agents using deionized water and seawater (3.5% NaCl) (conditions: 25 mg of 50% DPS/g-$C_5N_4$ composite, 80 min).

The performance of the optimized 50% DPS/g-$C_3N_4$ composite for photocatalytic hydrogen evolution using both deionized water and seawater was further determined using sacrificial agents. The efficiency of each hole scavenger was examined using a 5 vol % solution of the sacrificial agent and 25 mg of 50% DPS/g-$C_3N_4$ composite photocatalyst; the results are presented in FIG. 8B. Continuous $H_2$ production was typically achieved with a variety of sacrificial agents. Pure deionized water with no sacrificial agent produced 637.98 μmol of hydrogen per g of photocatalyst after 80 minutes of exposure. This limited $H_2$ evolution is related to the fact that water decomposition process involves complex multistep simultaneous reduction and oxidation reactions and employing pure water is usually inefficient. However, simulated seawater containing 3.5 wt % NaCl produced 1739.12 μmol $g^{-1}$ using same amount of catalyst and in the absence of any sacrificial agents. The main ionic components of seawater can serve as sacrificial agents and improve the photocatalytic hydrogen evolution from the seawater-splitting process. Seawater's ions such as $Na^+$ and $Cl^-$ may help catalysts transfer electrons more easily, increase the reduction reaction and inhibit the recombination of photoexcited electron-hole pairs resulting in improving the rate of $H_2$ evolution compared to pure water.

The introduction of a 5 vol % methanol in the deionized water solution resulted in a substantial increase in $H_2$ production, reaching 4956.8 μmol $g^{-1}$ which is 7 times higher than the quantity of $H_2$ evolved in pure deionized water with no sacrificial agent. When glycerol was included in the deionized water system, the greatest $H_2$ yield (7434.6 μmol $g^{-1}$) was attained which represents 1.5 and 1.4 times the $H_2$ yield employing methanol and ethanol, respectively.

In the photocatalytic hydrogen evolution, an effective sacrificial agent is defined not only by its rate of reactivity with the holes but also by the type of products it produces that might limit the effectiveness of the desired catalytic reaction and compete with it. Therefore, it is possible to hypothesize that while all three sacrificial agents could scavenge holes through oxidation, glycerol creates the fewest byproducts that could interfere with the catalytic reaction and restrict the production of hydrogen.

On the other hand, using methanol as a sacrificial agent produced the maximum $H_2$ output—7313.8 μmol $g^{-1}$ compared to ethanol and glycerol in the case of seawater. This indicates that ethanol and glycerol have less hole-capture capabilities in seawater compared to methanol using DPS/g-$C_3N_4$ composite. Comparable yields of $H_2$ were produced from seawater using ethanol and glycerol as sacrificial agents.

In contrast to deionized water, glycerol didn't appear to have achieved the best results using DPS/g-$C_5N_4$ composite in seawater. One of the reasons for this difference is the viscosity factor of glycerol which can lead to diffusion problems in seawater containing $Na^+$ and $Cl^-$ ions. Additionally, the competitive adsorption of salt ions on active sites may inhibit glycerol adsorption. Although all tested sacrificial agents have significant positive impact in enhancing the water decomposition process using DPS/g-$C_3N_4$ composite; glycerol is the preferred sacrificial agent for deionized water and methanol is the preferred sacrificial agent for seawater. In general, sacrificial agents function as electron donors or hole scavengers that lessen the recombination propensity of photoexcited charge carriers and adding them is crucial to significantly increase the photocatalytic $H_2$ evolution.

Figure 8C:
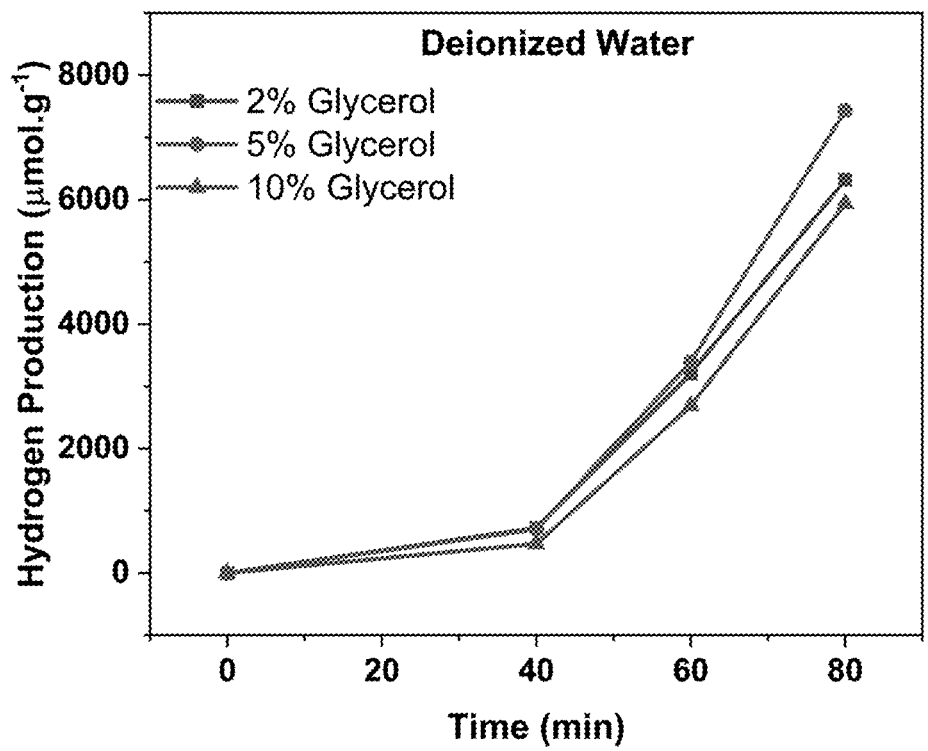
FIG. 8C illustrates the effect of the optimum sacrificial agent concentration using 25 mg of 50% DPS/g-$C_5N_4$ composite in deionized water
Figure 8D:
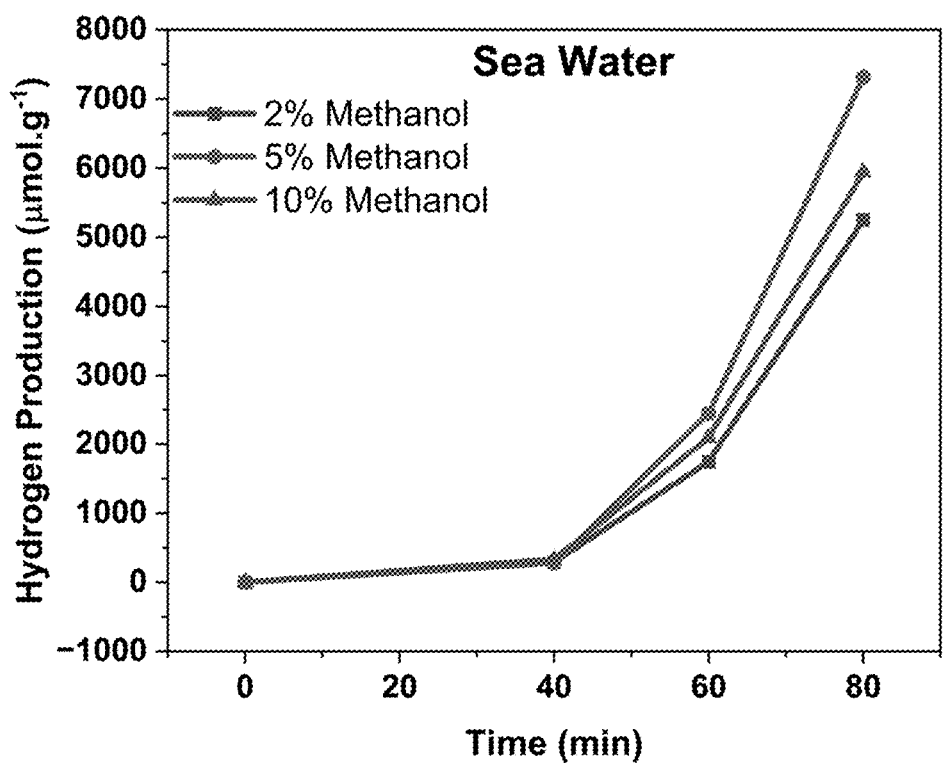
FIG. 8D illustrates the effect of the optimum sacrificial agent concentration using 25 mg of 50% DPS/g-$C_5N_4$ composite in seawater (3.5% NaCl)

After finding the best hole scavenger for both deionized water and seawater, its concentration in the solution was optimized by investigating $H_2$ generation with 2, 5 and 10 vol % of glycerol in deionized water and 2, 5 and 10 vol % of methanol in seawater. For all the samples, the amount of produced $H_2$ increased linearly with irradiation time. Results shown in FIG. 8C revealed that 5 vol % is the optimum concentration of glycerol in deionized water. The amount of hydrogen production decreased using both lower (2 vol %) and higher (10 vol %) concentrations of sacrificial agent. Hydrogen produced from deionized water was 6323.4 μmol $g^{-1}$ using 2 vol % glycerol, and 5940 μmol $g^{-1}$ using 10 vol % glycerol. These yields are 15% and 20% lower than using 5 vol % glycerol, respectively. The drop in $H_2$ evolution at higher concentrations of 10% glycerol can be attributed to the fact that photoactivity is reduced when active sites become saturated with the sacrificial agent molecules beyond a certain concentration. On the other hand, experiments were conducted on various concentrations of the optimal sacrificial agent, which is methanol in the case of seawater and results are displayed in FIG. 8D. The $H_2$ generation was reduced by 28.2% when 2 vol % methanol was used, and by 18.7% when 10 vol % methanol was used in comparison to 5 vol %. This demonstrates that the concentration of sacrificial agent plays an important role in the rate of hydrogen production and increasing sacrificial agent concentration cannot always lead to an increase in $H_2$ formation. It is observed that competing reduction reactions with undesired products such as carbon dioxide produced upon the oxidation of the sacrificial agents can minimize the production of $H_2$.

Effect of NaCl Concentration

Figure 8E:
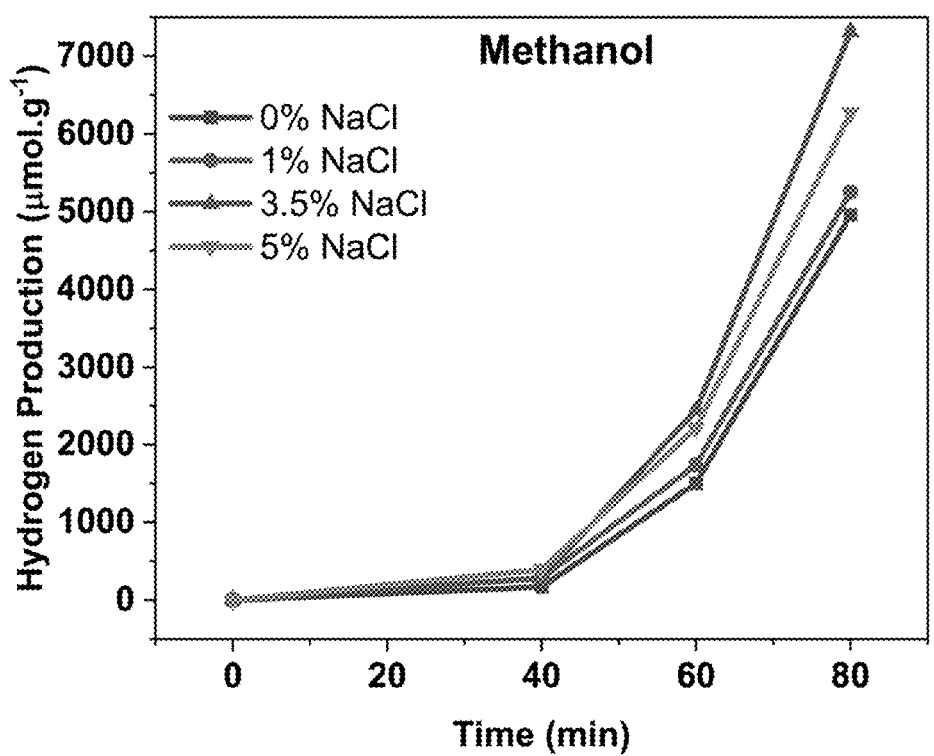
FIG. 8E illustrates the effect of NaCl concentration using 25 mg of 50% DPS/g-$C_3N_4$ composite.

To elucidate the effect of NaCl concentration on the photocatalytic hydrogen production, different concentrations (1%, 3.5% and 5%) of NaCl were tested using 25 mg of 50% DPS/g-$C_5N_4$ composite in the presence of 5 vol % methanol. Results shown in FIG. 8E displayed almost similar evolution for pure water (0% NaCl) and 1% NaCl aqueous solution. After 80 min of illumination, 3.5% NaCl aqueous system produced the highest $H_2$ yield which is 7313.8 μmol $g^{-1}$. Further increase in salt concentration to 5% resulted in decrease in $H_2$ generation. It is observed that beyond 0.3 M NaCl, the boosting propensity of $H_2$ production was reduced as NaCl concentration increased. Salinity salts, specifically sodium and chloride ions, directly participate in the redox reactions and charge transfer processes and elevated salinity levels have the potential to cause enhanced photo-corrosion and fouling of photocatalysts, which could affect the overall seawater splitting performance.

Figure 9:
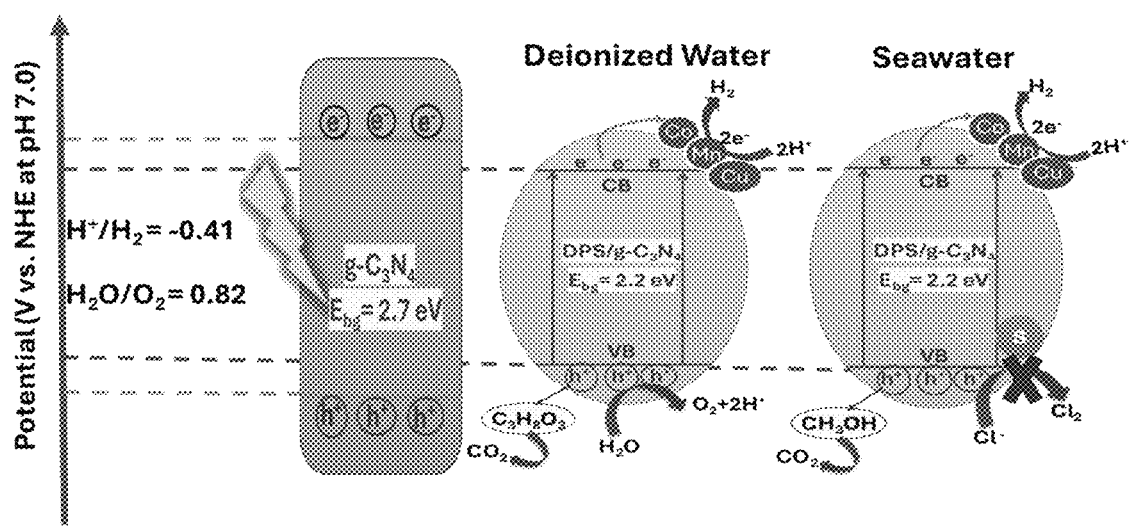
FIG. 9 illustrates the proposed mechanism of photocatalytic deionized water and seawater splitting of DPS/g-$C_5N_4$ composite.

FIG. 9 describes an exemplary mechanism of photocatalytic DPS/g-$C_5N_4$ composite in pure water and seawater splitting. When DPS/g-$C_5N_4$ composite absorbs photons from an irradiation source, it releases the photogenerated electron-hole pairs. The addition of DPS to the composite contributed to oxygen doping and simultaneous vacancy generation in the structure of g-$C_3N_4$, which improved the material's absorption capability, encouraged photocatalytic processes and sped up the rate of reaction. The accelerated electrons move to the catalyst surface, where metal ions originated from DPS act as active sites to absorb the electrons and speed up the process of producing $H_2$. Meanwhile, glycerol functions as a scavenger, trapping the holes in the valence band of DPS/g-$C_5N_4$ composite. In photocatalytic pure water splitting, the photoinduced electron-hole pairs from the DPS/g-$C_5N_4$ composite directly reduce and oxidize deionized water into hydrogen and oxygen, respectively.

In the case of photocatalytic seawater splitting, chloride ions would be oxidized by the photogenerated holes into hypochlorite anions, which would subsequently break down into chloride anions and oxygen. Seawater's ions help DPS/g-$C_5N_4$ composite transfer electrons more easily, increase the reduction reaction and inhibit the recombination of photoexcited electron-hole pairs resulting in improving the rate of $H_2$ evolution compared to pure water. The presence of sulfur in DPS/g-$C_5N_4$ composite inhibits the oxidation of chloride ions in seawater, thereby preventing the production of $Cl_2$. However, the diffusion of high viscosity glycerol is impeded by the presence of $Na^+$ and $Cl^-$ ions in seawater. Thus, methanol functions as a scavenger and traps the holes in the valence band of DPS/g-$C_5N_4$ composite.

There are several advantages to the invention, some of which include:

- The date palm syrup/g-C3N4 composite is made to effectively absorb light in the electromagnetic spectrum's visible region. Its ability to harvest a significant amount of sunlight is essential to the overall effectiveness of photocatalytic hydrogen generation.
- Combining the waste from the date palm industry with the growing requirement of hydrogen production helps counter two issues: a) reducing the cost of the raw materials to prepare the composite which will overall reduce the cost of the final composite and b) recycling waste from the date palm industry makes the process more environment friendly.
- Using waste biodegradable ingredients as an ingredient makes the process of preparing the product sustainable.
- The ease of preparing the catalyst. The process of preparing the catalyst is a simple process and does not require heavy machinery or distillation processes. Thereby, simplifying the production process and thereby reducing the overall time as well as the cost of the process.
- Date palm syrup can be utilized as an alternative to expensive metal cocatalysts such as Pt, Pd, Au, Ru, Ni, and Rh which further reduces the cost of the final composite.
- The composite of the invention is able to provide a remarkable photocatalytic activity.
- The DPS/g-$C_5N_4$ composite exhibited excellent light-absorbing properties and effective charge separation compared to pure g-$C_3N_4$.
- The presence of DPS in the g-$C_3N_4$ composite is capable of effectively separating charges and suppressed charge recombination which is essential for increased photocatalytic performance.
- 50% DPS/g-$C_5N_4$ composite showed the best photocatalytic performance which is 7434.6 µmol $g^{-1}$.
- DPS/g-$C_5N_4$ composite is environmentally friendly with high photocatalytic activity, ease of production, and a low cost-all of which are advantages for its practical use.

In addition to photocatalytic hydrogen production, the composite may also find its use in reduction of carbon dioxide to hydrocarbons, photocatalytic reduction of Nitrogen oxides, photodegradation of dyes and phenols, storage devices, and in material science.

Specific examples of method have been described herein for purposes of illustration. These are only examples. The technology provided herein can be applied to method other than examples described above. Many alterations, modifications, additions, omissions and permutation are possible within the practice of this invention. This invention includes variations on described embodiments that would be apparent to the skilled addressee, including variations obtained by replacing features, elements, and/or omitting combining features, elements and/or acts from described embodiments.

It is therefore intended that the following appended claims and claims hereafter introduced are interpreted to include all such modifications, permutations, additions, omissions and sub-combinations as may be reasonably inferred. The scope of the claims should not be limited by the preferred embodiments set forth in the examples but should be given the broadest interpretation consistent with the description as a whole.

The invention claimed is:

1. A method of generating hydrogen from water comprising
   providing water
   providing a date palm syrup-graphitic carbon nitride composite
   contacting the date palm syrup-graphitic carbon nitride composite with water in presence of light for generating hydrogen.

2. The method of claim 1, wherein the water is any of or combination of desalinated water, sea water, deionised water, recycled water, ocean water, brackish water, ground water and wastewater.

3. The method of claim 1, further comprises adding an electron donor while contacting the composite with the water.

4. The method of claim 1, wherein the method further comprises maintaining the reaction temperature at about 10° C. to about 15° C.

5. The method as claimed in claim 1, wherein contacting the date palm syrup-graphitic carbon nitride composite with water in presence of light causes the hydrogen to evolve in concentration of about 3034.6 µmol $g^{-1}$ to about 7434.6 µmol $g^{-1}$.

6. A date palm syrup-graphitic carbon nitride composite for use as a photocatalyst.

* * * * *